(12) United States Patent
Watahiki et al.

(10) Patent No.: US 12,191,525 B2
(45) Date of Patent: Jan. 7, 2025

(54) BATTERY MODULE

(71) Applicant: Vehicle Energy Japan Inc., Hitachinaka (JP)

(72) Inventors: Yoshitaka Watahiki, Hitachinaka (JP); Sadayuki Aoki, Hitachinaka (JP); Kazunori Ojima, Hitachinaka (JP); Osamu Kubota, Hitachinaka (JP)

(73) Assignee: Vehicle Energy Japan Inc., Hitachinaka (JP)

( * ) Notice: Subject to any disclaimer, the term of this patent is extended or adjusted under 35 U.S.C. 154(b) by 738 days.

(21) Appl. No.: 17/293,326

(22) PCT Filed: Oct. 31, 2019

(86) PCT No.: PCT/JP2019/042866
§ 371 (c)(1),
(2) Date: May 12, 2021

(87) PCT Pub. No.: WO2020/100621
PCT Pub. Date: May 22, 2020

(65) Prior Publication Data
US 2021/0408641 A1     Dec. 30, 2021

(30) Foreign Application Priority Data

Nov. 16, 2018   (JP) .................. 2018-215813

(51) Int. Cl.
*H01M 50/503* (2021.01)
*H01M 50/209* (2021.01)
(Continued)

(52) U.S. Cl.
CPC ....... *H01M 50/503* (2021.01); *H01M 50/209* (2021.01); *H01M 50/50* (2021.01);
(Continued)

(58) Field of Classification Search
None
See application file for complete search history.

(56) References Cited

U.S. PATENT DOCUMENTS

| 2010/0066350 A1 | 3/2010 | Matsumura et al. |
| 2013/0288530 A1 | 10/2013 | Zhao |

(Continued)

FOREIGN PATENT DOCUMENTS

| CN | 105047497 A | 11/2015 |
| CN | 103779518 B | 11/2016 |

(Continued)

OTHER PUBLICATIONS

Chinese-language Office Action issued in Chinese Application No. 201980067502.7 dated Jan. 13, 2023 (eight (8) pages).
(Continued)

*Primary Examiner* — Alix E Eggerding
(74) *Attorney, Agent, or Firm* — Crowell & Moring LLP

(57) ABSTRACT

Provided is a battery module capable of improving the safety as compared with the conventional one. The battery module includes a plurality of battery cells, and busbars 10 connecting to external terminals of the battery cells. The busbars 10 include a busbar, the busbar has a pair of terminal portions 11 and 12, a current-carrying portion 13 connecting the pair of terminal portions 11 and 12, and a fuse 14 placed at the current-carrying portion 13. The current-carrying portion 13 surrounds the fuse 14.

9 Claims, 11 Drawing Sheets

(51) Int. Cl.
*H01M 50/50* (2021.01)
*H01M 50/507* (2021.01)
*H01M 50/583* (2021.01)

(52) U.S. Cl.
CPC ....... *H01M 50/507* (2021.01); *H01M 50/583* (2021.01); *H01M 2200/103* (2013.01); *H01M 2220/20* (2013.01)

(56) References Cited

U.S. PATENT DOCUMENTS

| | | | |
|---|---|---|---|
| 2018/0331345 | A1 | 11/2018 | Lim et al. |
| 2018/0351152 | A1* | 12/2018 | Reingruber ............ H01R 13/68 |
| 2019/0379015 | A1* | 12/2019 | Ochi ................... H01M 50/505 |
| 2020/0321589 | A1 | 10/2020 | Watahiki et al. |

FOREIGN PATENT DOCUMENTS

| | | |
|---|---|---|
| CN | 205723356 U | 11/2016 |
| CN | 206727149 U | 12/2017 |
| JP | 11-67190 A | 3/1999 |
| JP | 2001-338635 A | 12/2001 |
| JP | 2007-280898 A | 10/2007 |
| JP | 2010-71777 A | 4/2010 |
| JP | 2013-196932 A | 9/2013 |
| JP | 2016-66455 A | 4/2016 |
| JP | 2017-98038 A | 6/2017 |
| JP | 2017-117574 A | 6/2017 |
| WO | WO 2018/055677 A1 | 3/2018 |
| WO | WO 2019/069837 A | 4/2019 |

OTHER PUBLICATIONS

Chinese-language Office Action issued in Chinese Application No. 201980067502.7 dated Sep. 5, 2022 (nine (9) pages).
International Search Report (PCT/ISA/210) issued in PCT Application No. PCT/JP2019/042866 dated Feb. 4, 2020 with English translation (four (4) pages).
Japanese-language Written Opinion (PCT/ISA/237) issued in PCT Application No. PCT/JP2019/042866 dated Feb. 4, 2020 (four (4) pages).
Extended European Search Report issued in European Application No. 19884728.7 dated Oct. 8, 2024 (8 pages).

* cited by examiner

Fig. 8
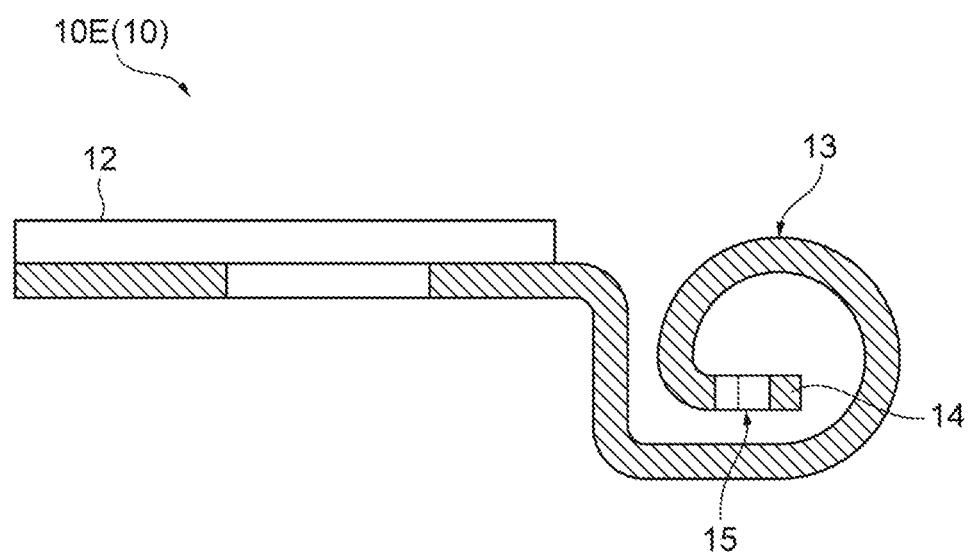
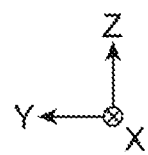

Fig. 11
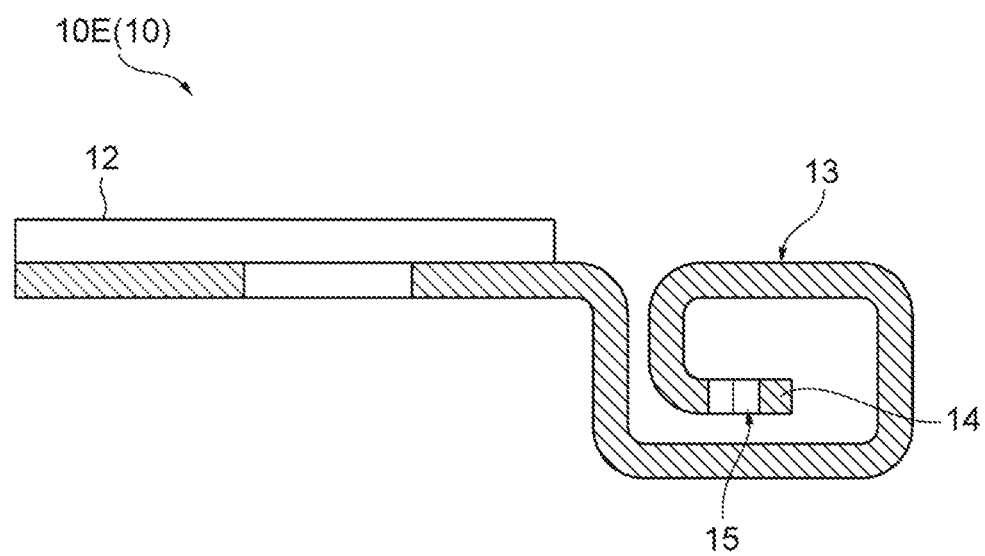
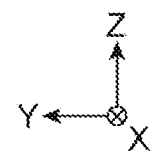

BATTERY MODULE

TECHNICAL FIELD

The present disclosure relates to battery modules each having a plurality of battery cells.

BACKGROUND ART

Conventionally inventions about an electric storage device including a plurality of battery cells and busbars have been known (see Patent Literature 1). The electric storage device according to Patent Literature 1 includes: a first battery cell block including a plurality of battery cells; a second battery cell block including other plurality of battery cells; and a busbar electrically connecting the plurality of battery cells in the first battery cell block and the plurality of battery cells in the second battery cell block.

The busbar has a first busbar part, a second busbar part, and a third busbar part. The first busbar part connects to one of the positive electrodes and the negative electrodes of the plurality of battery cells in the first battery cell block via fuses. The second busbar part connects to the other of the positive electrodes and the negative electrodes of the plurality of battery cells in the second battery cell block. The third busbar part connects the first busbar part and the second busbar part.

The third busbar part includes a first portion adjacent to the first busbar part and a second portion closer to the second busbar part than the first portion. The second portion radiates heat more than the first portion does (see this literature, claim 1, for example).

According to this structure, in the third busbar part, the first portion closer to the fuse radiates less heat, and the second portion away from the fuse radiates more heat. This means that the first portion closer to the fuse is not restricted for the fuse function such as a current value during the current interruption, and the fuse therefore fulfills the original function. The second portion away from the fuse radiates more heat. This reduces heat generated at the fuse effectively due to the radiative effect so as to suppress the transmission of the heat to other battery cells (see this literature, paragraph 0011, for example).

This conventional electric storage device has a plurality of openings in a flat plate arranged above the positive electrodes. This flat plate has a positive-electrode tab extending in an L shape on the inner peripheral edge of each opening, and the tip of this positive-electrode tab is provided with a fuse. The fuse has a connecting portion at the tip, and the connecting portion is connected to the positive electrode of the battery cell by welding, for example. The fuse blows when an overcurrent exceeding a predetermined value flows (see this literature, paragraphs 0022-0023, FIG. 3, for example).

CITATION LIST

Patent Literature

Patent Literature 1: JP 2016-66455 A

SUMMARY OF INVENTION

Technical Problem

In the above-mentioned conventional electric storage device, the fuses are exposed at a position facing the resin case accommodating the battery cells. When a fuse blows, the molten metal may scatter and adhere to the resin case, which may degrade the safety of the electric storage device.

The present disclosure provides a battery module capable of improving the safety as compared with the conventional ones.

Solution to Problem

A battery module according to one aspect of the present disclosure includes: a plurality of battery cells; and busbars connected to external terminals of the battery cells. The busbars include a busbar, the busbar has a pair of terminal portions, a current-carrying portion connecting the pair of terminal portions, and a fuse provided in the current-carrying portion. The current-carrying portion surrounds the fuse.

Advantageous Effects of Invention

According to the above aspect of the present disclosure, a part of the current-carrying portion, which is a path of the current flowing between the pair of terminal portions of the busbar, surrounds the fuse provided in the current-carrying portion. This configuration prevents scattering of the molten metal when the fuse blows. The present disclosure therefore provides a battery module capable of improving the safety as compared with the conventional ones.

BRIEF DESCRIPTION OF DRAWINGS

FIG. 8 is a cross-sectional view of the busbar taken along the line VIII-VIII of FIG. 6.

FIG. 11 is a cross-sectional view of the busbar shown in FIG. 10, which is a view corresponding to FIG. 8.

DESCRIPTION OF EMBODIMENTS

Figure 1:
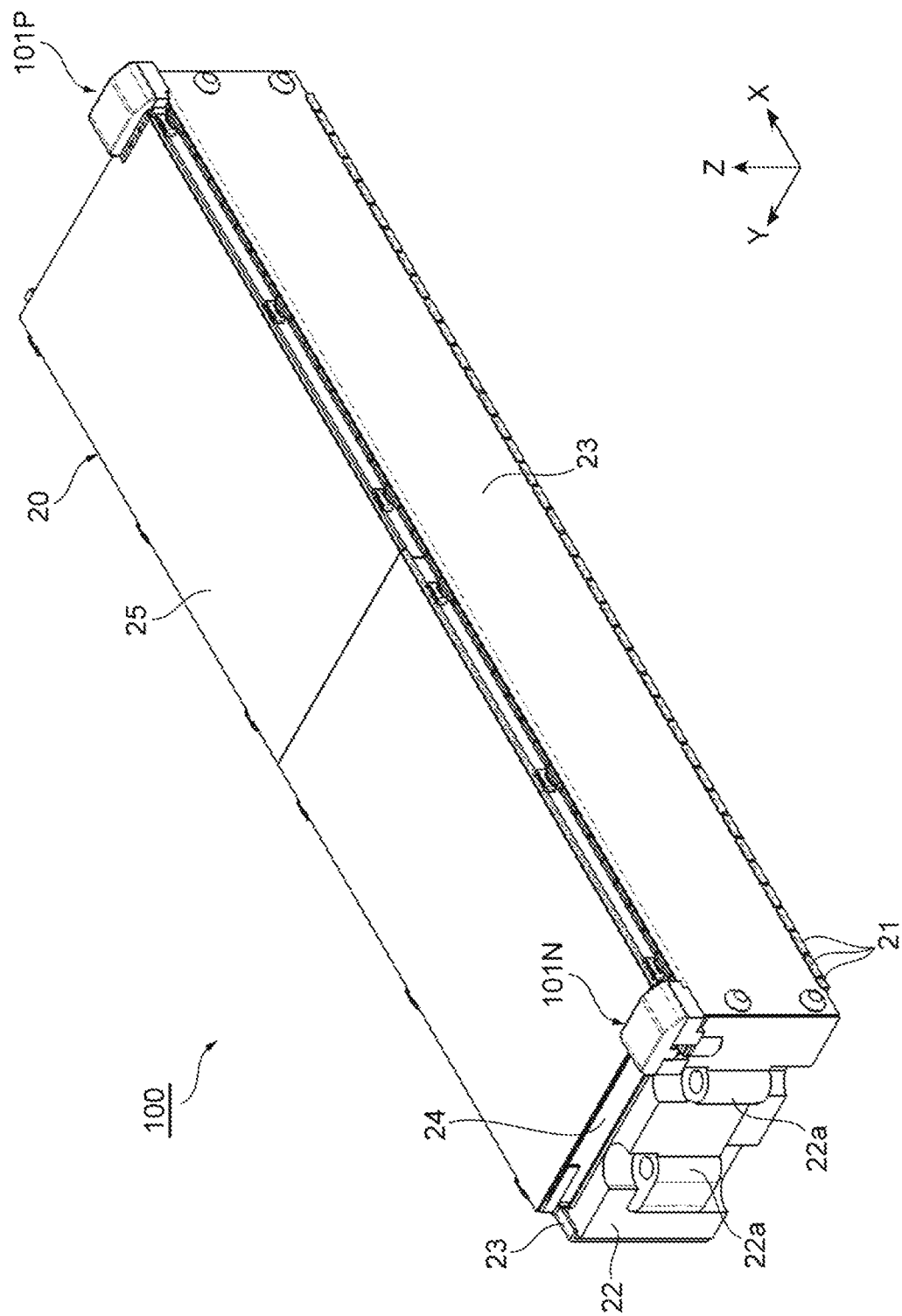
FIG. 1 is a perspective view of a battery module according to one embodiment of the present disclosure.

The following describes some embodiments of a battery module according to the present disclosure, with reference to the drawings. The following may describe various parts of the battery module while referring to the orthogonal coordinate system having X-axis, Y-axis, and Z-axis shown in the drawings. In the following descriptions, directional terms, such as upper, lower, left, right, vertical, horizontal, front, and rear, are used for convenience to explain various parts of the battery module shown in the drawings, and these terms do not limit the posture of the battery module and the arrangement of the parts.

Figure 2:
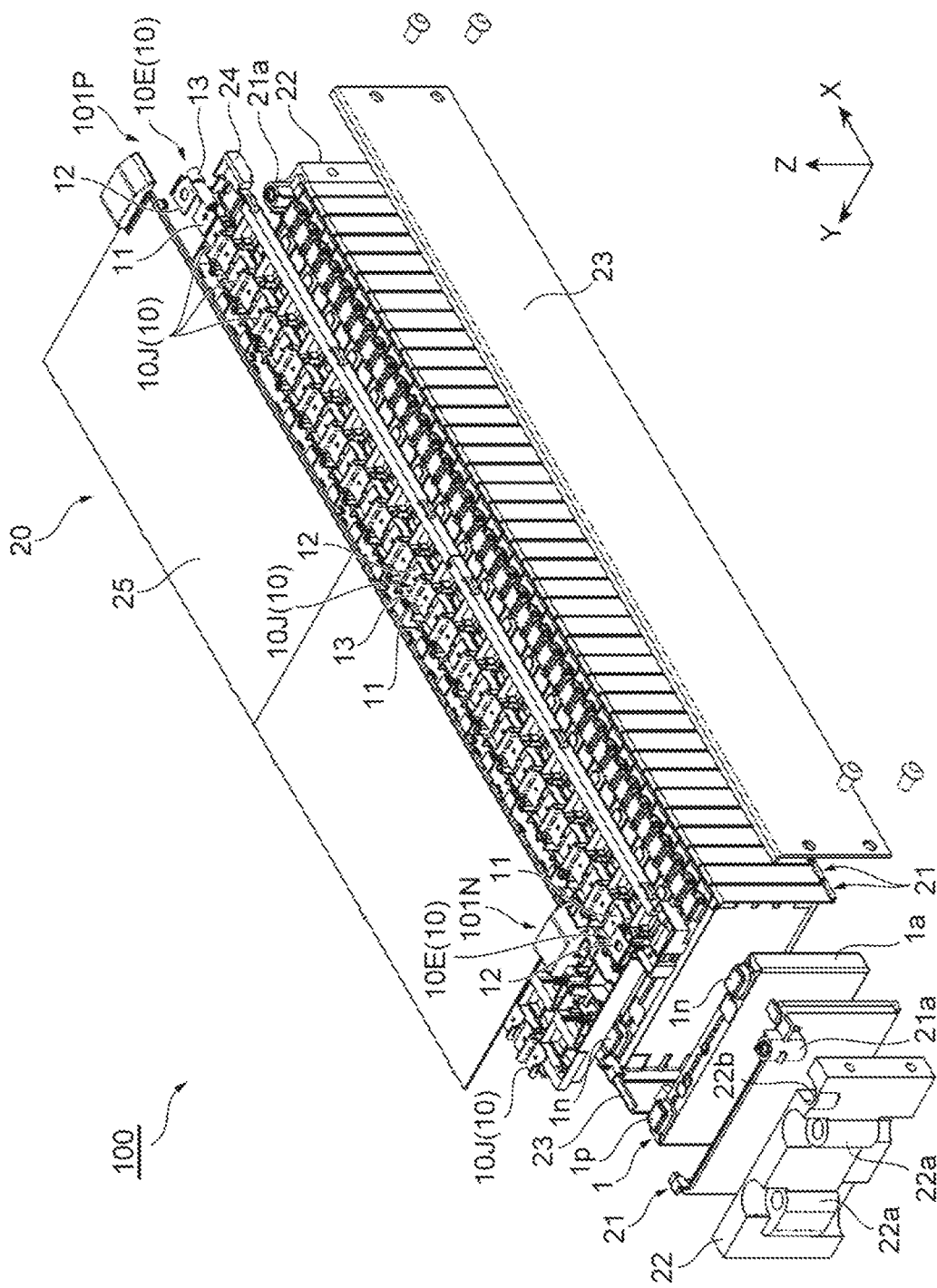
FIG. 2 is an exploded perspective view of the battery module in FIG. 1.
Figure 3:
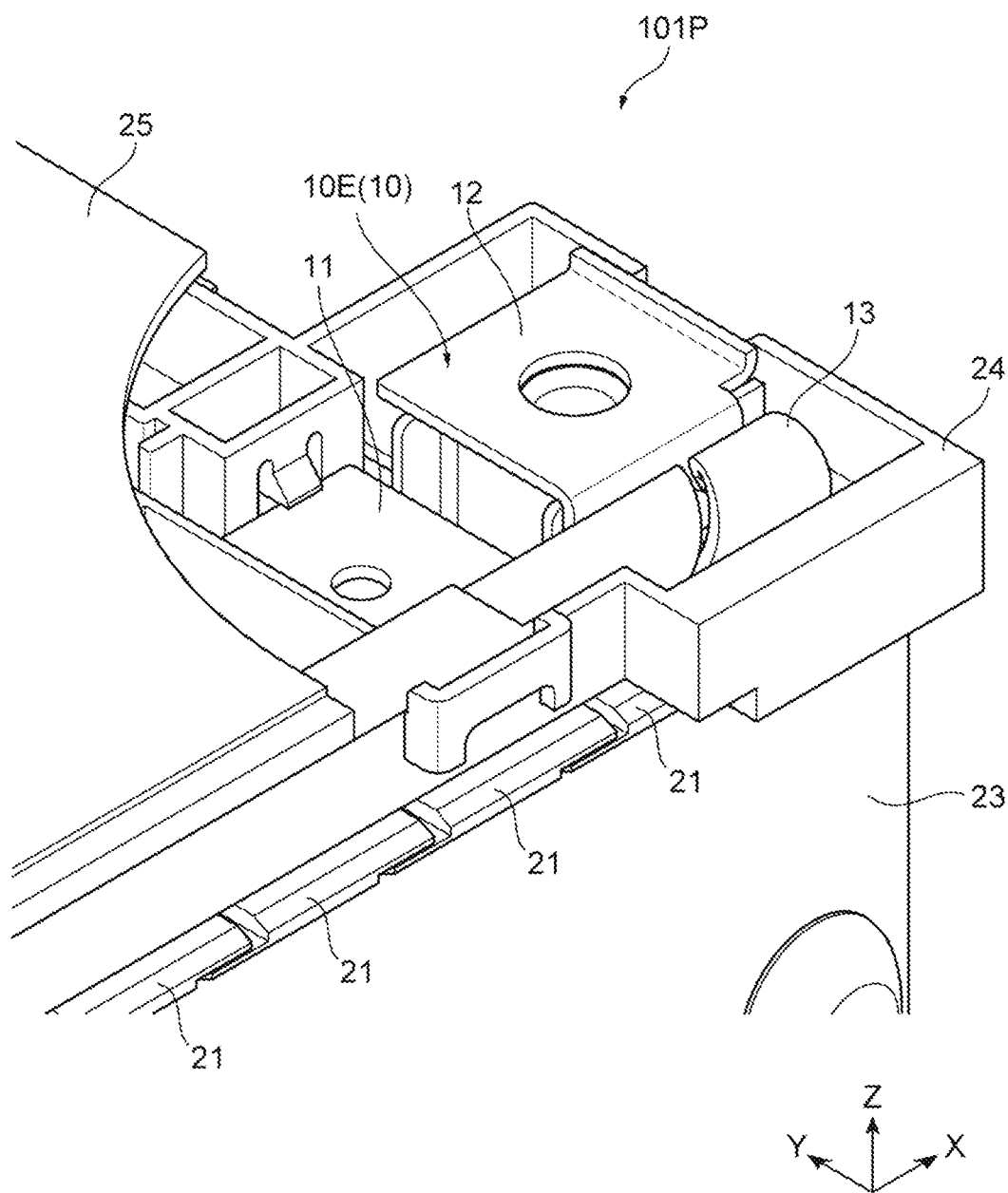
FIG. 3 is an enlarged perspective view of a module terminal of the battery module in FIG. 1.

FIG. 1 is a perspective view showing the appearance of a battery module 100 according to one embodiment of the present disclosure. FIG. 2 is an exploded perspective view of the battery module 100 in FIG. 1. FIG. 3 is an enlarged perspective view of a module terminal 101P of the battery module 100 shown in FIG. 1. FIG. 3 is a cutaway view of a module cover 25, which is a part of a housing 20 of the battery module 100 shown in FIG. 1.

Although the details are described later, the battery module 100 of the present embodiment has the following major features. The battery module 100 includes a plurality of battery cells, and busbars 10 connecting to external terminals 1p and 1n of the battery cells 1. One of the busbars 10 has a pair of terminal portions 11 and 12, a current-carrying portion 13 connecting the pair of terminal portions 11 and 12, and a fuse 14 is provided in the current-carrying portion 13 (see FIG. 6 and FIG. 8, for example). The current-carrying portion 13 surrounds the fuse 14.

The following describes various parts of the battery module 100 of the present embodiment in details. The battery module 100 includes the plurality of battery cells 1, and a housing 20 that stores the plurality of battery cells 1. In one example, the plurality of battery cells 1 are lithium ion secondary batteries each having a flattened rectangular shape, and these battery cells are stacked in their thickness direction. The XYZ orthogonal coordinate system shown in the drawings has the X-axis parallel to the thickness direction of the battery cells 1, that is, the stacking direction of the plurality of cells 1, the Y-axis parallel to the width direction of the battery cells 1, and the Z-axis parallel to the height direction of the battery cells 1.

Each battery cell 1 includes a flattened rectangular cell case 1a, an electrode group and electrolyte that are stored in this cell case 1a, and a pair of external terminals 1p and 1n connecting to the electrode group and disposed on the vertically upper end face of the cell case 1a. The external terminals 1p and 1n each have a substantially cuboid three-dimensional shape that protrudes vertically (in the Z-axis direction) from the upper end face of the cell case 1a. Respective resin insulating members electrically isolate between the external terminal 1p, 1n and the cell case 1a, and between the cell case 1a and the electrode group. The plurality of battery cells 1 are stacked while reversing their direction by 180° so that the positive-electrode external terminal 1p of one of mutually adjacent battery cells 1 and the negative-electrode external terminal 1n of the other battery cell 1 are adjacent to each other in the stacking direction (X-axis direction).

The housing 20 has a substantially cuboid shape, having the dimension in the length direction (X-axis direction) that is larger than the dimensions in the transverse direction (Y-axis direction) and in the height direction (Z-axis direction), and holds the plurality of battery cells 1 stacked in the thickness direction. Specifically, the housing 20 has a plurality of cell holders 21, a pair of end plates 22, a pair of side plates 23, an insulation cover 24 and a module cover 25, for example.

In one example, the cell holders 21 are made of a resin material such as polybutylene terephthalate (PBT). In one example, each cell holder 21 intervenes between mutually adjacent battery cells 1 of the plurality of battery cells 1 stacked in the thickness direction (X-axis direction), and holds these battery cells 1 to sandwich them from both sides in the thickness direction. In one example, the pair of cell holders 21 placed at both ends in the stacking direction (X-axis direction) of the plurality of battery cells 1 each have a fixing part 21a to fix an end busbar 10E described later.

In one example, the pair of end plates 22 includes plate members made of metal. The pair of end plates 22 is disposed at both ends of in the stacking direction (X-axis direction) of the plurality of battery cells 1 via the pair of cell holders 21. Each of the end plates 22 as a pair has one face that is opposed to the plurality of battery cells 1 held at the cell holders 21. The other face of the end plate 22 is directed to the other side of the battery cells 1, and has a fixing part 22a. The end plates 22 as a pair each have the face that is opposed to the plurality of battery cells 1, and this face has a concave 22b to engage with the fixing part 21a of the corresponding cell holder 21.

The fixing part 22a at the end plate 22 is substantially cylindrical, and a part of the cylindrical face protrudes outward from the outer face of the end plate 22. The fixing part 22a at the end plate 22 has a bolt hole that is bored along the center axis parallel to the height direction (Z-axis direction) of the end plate 22. This fixing part 22a of the end plate 22 is to fix the battery module 100 to an external mechanism, such as a vehicle or another machine. The concave 22b of the end plate 22 engages with the fixing part 21a of the cell holder 21 to hold the fixing part 21a of the cell holder 21.

The pair of side plates 23 is disposed at both ends in the width direction (Y-axis direction) of the battery cells 1 via the cell holders 21. In one example, the side plates 23 as a pair are metal plates each having a substantially rectangular shape, and are mutually opposed at both ends of the housing 20 in the transverse direction (Y-axis direction). The side plates 23 as a pair are substantially oblongs, having the long-side direction, i.e., longitudinal direction in the stacking direction (X-axis direction) of the plurality of battery cells 1 and the short-side direction, i.e., transverse direction in the height direction (Z-axis direction) of the battery cells 1. The pair of side plates 23 are fastened at both ends in the longitudinal direction to the pair of end plates 22 by fasteners, such as rivets or bolts, and engage with recessed grooves of the cell holders 21 at both ends in the transverse direction.

The insulation cover 24 is a plate member made of resin such as engineering plastic including PBT that has an electrical insulating property, and is opposed to the upper end face of each cell case 1a having the external terminals 1p and 1n of the battery cell 1. The insulation cover 24 has openings to expose the upper end faces of the external terminals 1p and 1n of the plurality of battery cells 1 and a partition wall for insulation between the external terminals 1p and 1n of the adjacent battery cells 1 and between the mutually adjacent busbars 10. In one example, the partition wall of the insulation cover 24 is disposed so as to surround the external terminals 1p and 1n of the battery cells 1 and the busbars 10. Various types of electric wiring is placed on the insulation cover 24 to connect to the battery cells 1, an electronic circuit board, and the like.

The busbars 10 are plate members made of metal having electrical conductivity that connect the plurality of battery cells 1 and also connect these connected battery cells 1 to the module terminals 101P and 101N. Specifically, the busbars 10 include a plurality of relay busbars 10J that connect the plurality of battery cells 1, and a pair of end busbars 10E that connect the plurality of battery cells 1, which are connected by the plurality of relay busbars 10J, to the module terminals 101P and 101N.

The relay busbars 10J each have a pair of terminal portions 11 and 12, and a current-carrying portion 13 connecting the pair of terminal portions 11 and 12. The pair of terminal portions 11 and 12 of the relay busbar 10J are rectangular plate portions that are substantially parallel to the upper end faces of the external terminals 1p and 1n of the battery cell 1. The terminal portions 11 and 12 of the relay busbar 10J are connected by welding, for example, to the upper end faces of the external terminals 1p and 1n, respectively, of the plurality of battery cells 1 exposed through the openings of the insulation cover 24. The pair of terminal portions 11 and 12 of the relay busbar 10J may be connected to the external terminals 1p and 1n of the corresponding battery cell 1 via fasteners such as bolts or rivets.

The current-carrying portion 13 of each relay busbar 10J is bent from the terminal portion 11 in the height direction (Z-axis direction) of the battery cell 1 to extend upward so as to be away from the battery cell 1, and is bent in the opposite direction to be connected to the other terminal portion 12. That is, the current-carrying portion 13 of the relay busbar 10J is bent in a substantially U shape in the side view in the width direction (Y-axis direction) of the battery cell 1. In one example, each of the plurality of relay busbars 10J is connected to the positive-electrode external terminal 1p of one of mutually adjacent battery cells 1 in the stacking direction and the negative-electrode external terminal 1n of the other battery cell 1, so as to connect the plurality of battery cells 1 in series.

Similarly to the relay busbars 10J, the end busbars 10E each have a pair of terminal portions 11 and 12, and a current-carrying portion 13 connecting the pair of terminal portions 11 and 12. The terminal portions 11 of the pair of end busbars 10E are a rectangular plate portion that is substantially parallel to the upper end faces of the external terminals 1p and 1n of the battery cells 1. The other terminal portions 12 of the pair of end busbars 10E are a rectangular plate portion that is substantially parallel to the one terminal portion 11, and is placed at a position farther away from the battery cell 1 than the one terminal portion 11 in the height direction (Z-axis direction) of the battery cells 1.

One of the pair of end busbars 10E has the terminal portion 11 connected to the positive-electrode external terminal 1p of the battery cell 1 placed at one end in the stacking direction of the plurality of battery cells 1. The other of the pair of end busbars 10E has the terminal portion 11 connected to the negative-electrode external terminal 1n of the battery cell 1 placed at the other end in the stacking direction of the plurality of battery cells 1. These terminal portions 11 of the pair of end busbars 10E are connected by welding, for example, to the upper end faces of the external terminals 1p and 1n of the battery cells 1, respectively.

Of the pair of end busbars 10E, the end busbar 10E connected to the negative-electrode external terminal 1n of the battery cell 1 has a current-carrying portion 13 that is bent from the terminal portion 11 in the height direction (Z-axis direction) of the battery cell 1 to extend upward to move away from the battery cell 1, and is connected to the other terminal portion 12. Of the pair of end busbars 10E, the end busbar 10E connected to the positive-electrode external terminal 1p of the battery cell 1 has a current-carrying portion 13 that is bent into a tubular shape extending in one direction (X-axis direction) so as to surround a fuse 14 disposed inside (see FIG. 6 and FIG. 8, for example). Details of the end busbar 10E having the current-carrying portion 13 surrounding the fuse 14, which is a feature of the battery module 100 of the present embodiment, will be described later with reference to FIGS. 4 to 9.

The terminal portions 12 of the pair of end busbars 10E are fastened and fixed to the fixing portions 21a of the cell holders 21 at both ends in the stacking direction of the battery cells 1 by fasteners such as bolts and nuts. The fixing portions 21a of these cell holder 21 engage with the concaves 22b of the pair of end plates 22 for fixing. With this configuration, the terminal portions 12 of the pair of end busbars 10E are fixed to the pair of end plates 22 via the fixing portions 21a of the cell holders 21.

In this way, the battery module 100 of the present embodiment includes the pair of end plates 22 placed at both ends in the stacking direction of the plurality of battery cells 1 each having a flattened rectangular shape and stacked in the thickness direction. The end busbars 10E are fixed to the end plates 22. In other words, the terminal portions 12 of the pair of end busbars 10E are connected to the positive-electrode module terminal 101P and the negative-electrode module terminal 101N of the battery module 100, respectively, and are a part of the module terminals 101P and 101N. These positive-electrode module terminal 101P and negative-electrode module terminal 101N are external terminals of the battery module 100, and are connected to an external electric device via wiring, for example.

That is, the battery module 100 of the present embodiment is connected to an external electric device such as a generator or a motor via the positive-electrode module terminal 101P and the negative-electrode module terminal 101N. Receiving electricity from the external electric device via the module terminals 101P and 101N, the plurality of battery cells 1 of the battery module 100 will be charged. The battery module 100 can also supply electricity from the plurality of charged battery cells 1 to the external electrical device via the plurality of relay busbars 10J, the pair of end busbars 10E, and the pair of module terminals 101P and 101N.

Figure 4:
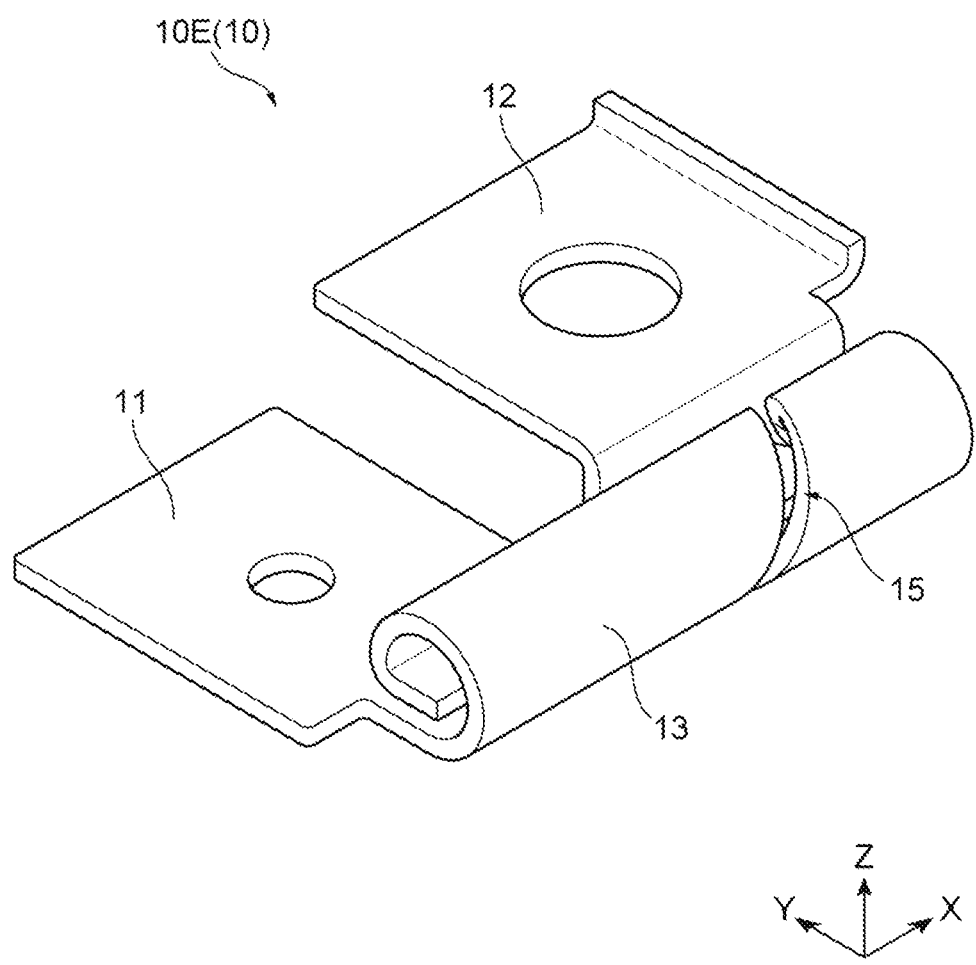
FIG. 4 is a perspective view of the busbar constituting the module terminal shown in FIG. 3.
Figure 5:
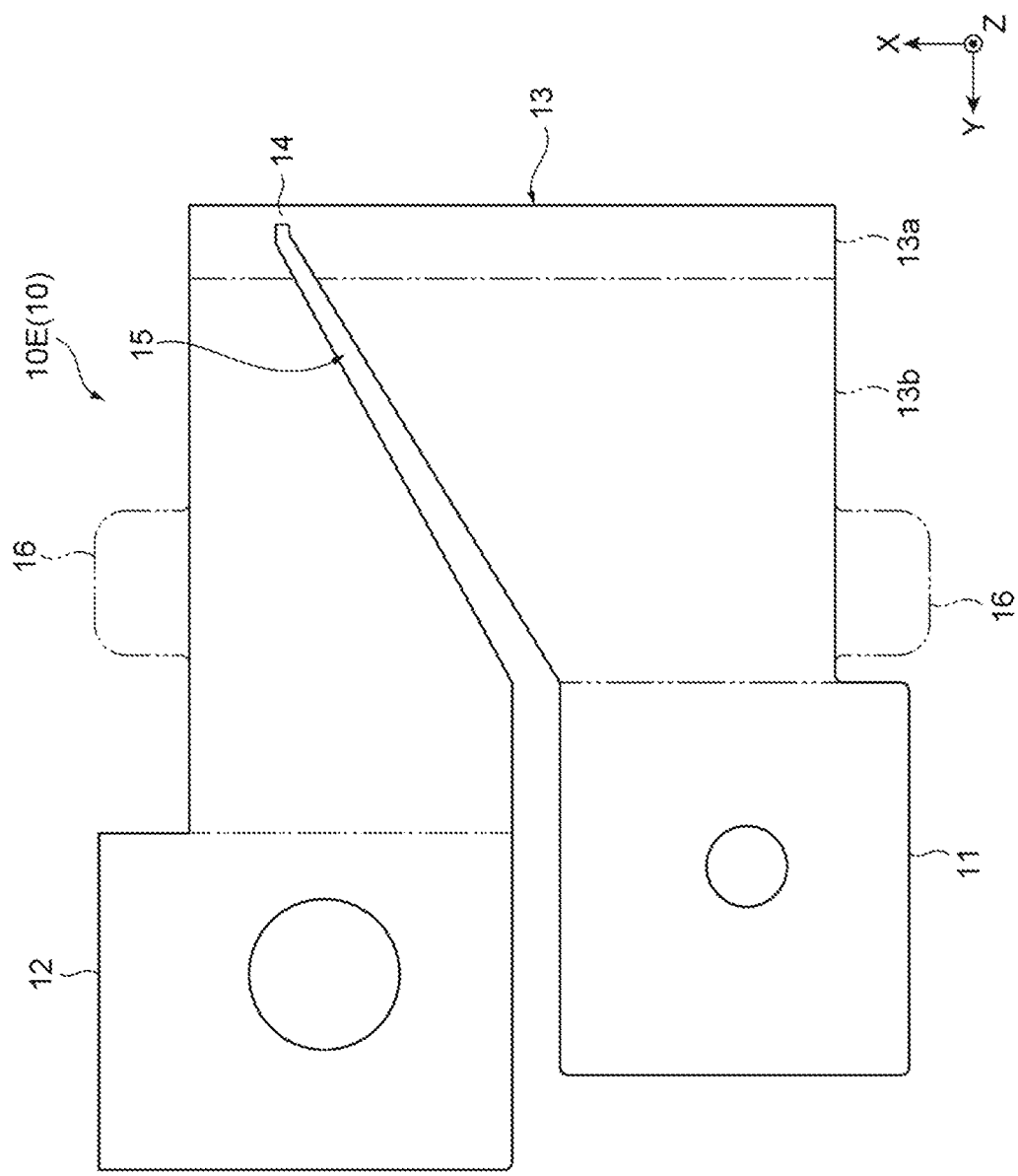
FIG. 5 is a developed view of the busbar shown in FIG. 4.
Figure 6:
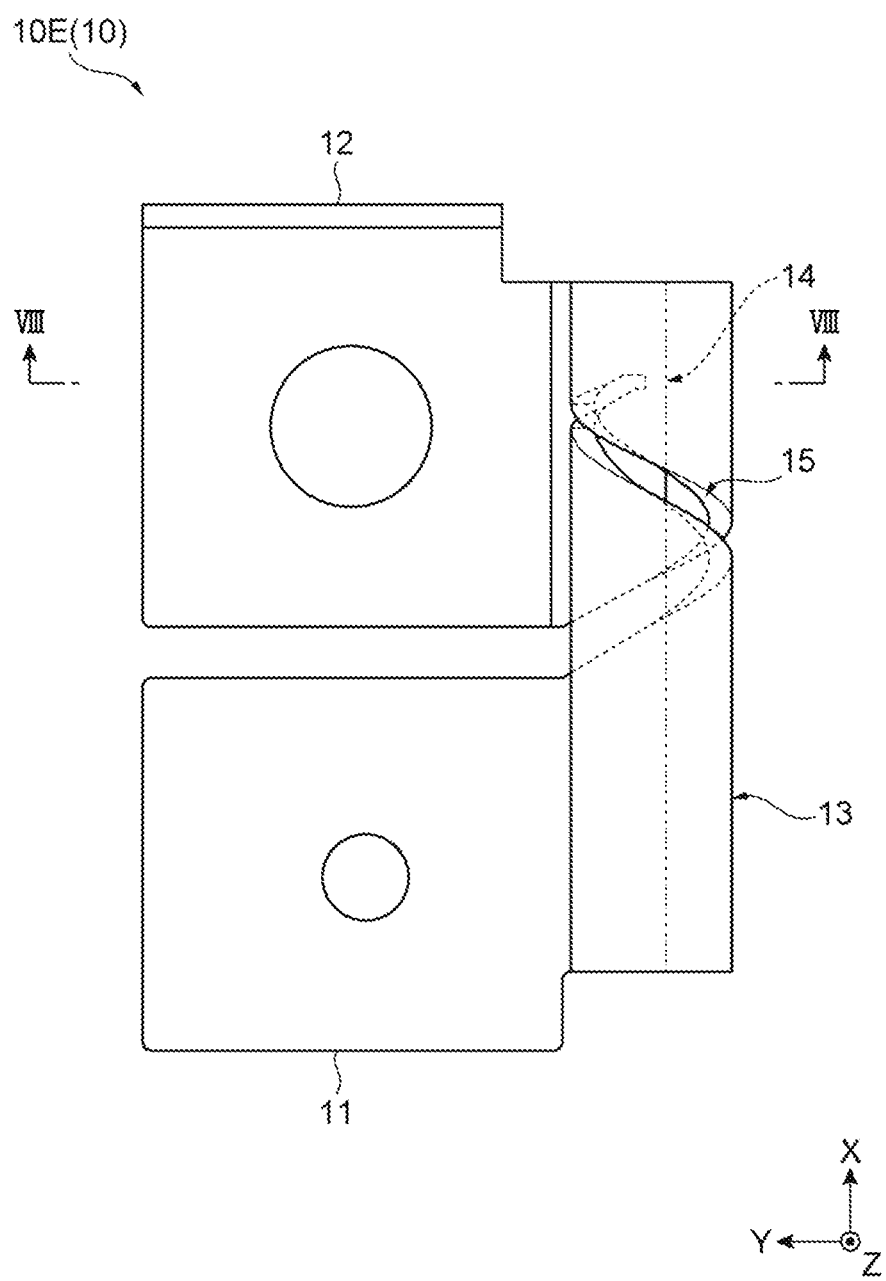
FIG. 6 is a plan view of the busbar shown in FIG. 4.
Figure 7:
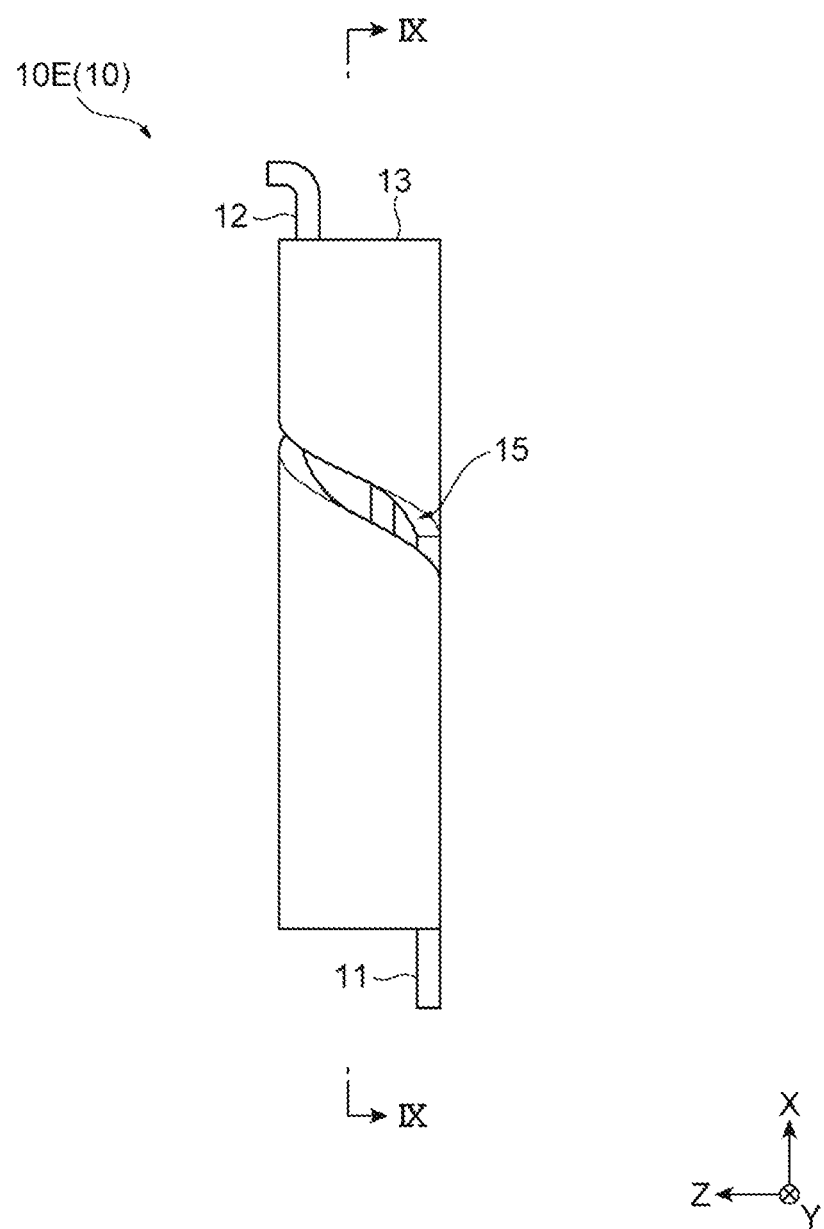
FIG. 7 is a front view of the busbar shown in FIG. 4.
Figure 9:
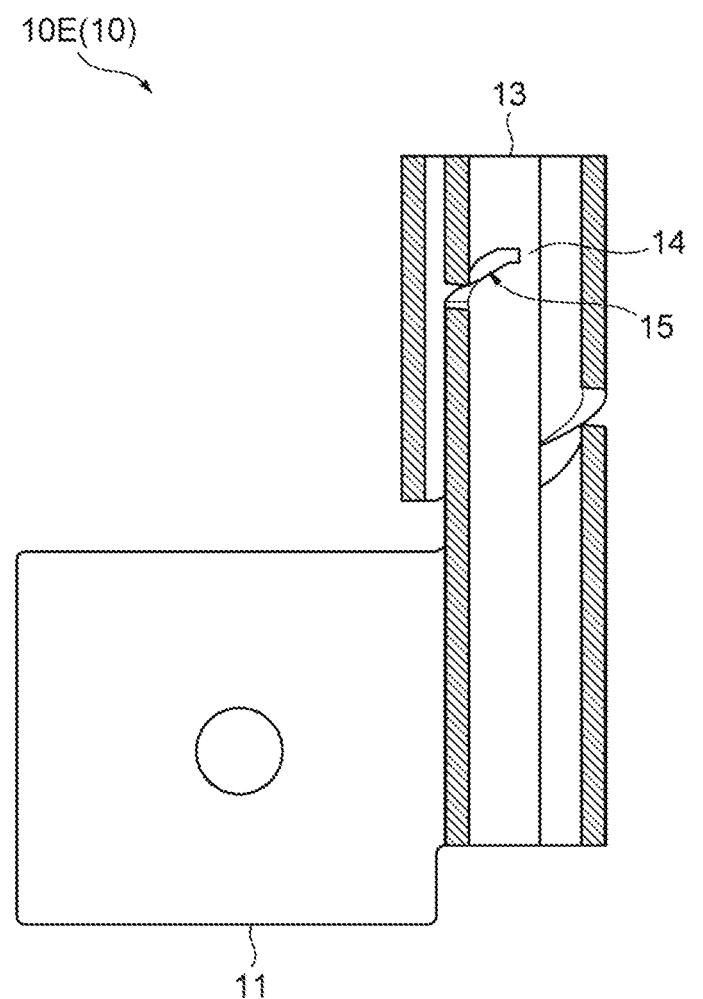
FIG. 9 is a cross-sectional view of the busbar taken along the line IX-IX of FIG. 7.

Referring to FIGS. 4 to 9, the following describes the feature of the battery module 100 of the present embodiment in detail. FIG. 4 is a perspective view of the end busbar 10E constituting the module terminal 101P shown in FIG. 3. FIG. 5 is a developed view of the end busbar 10E shown in FIG. 4. FIG. 6 is a plan view of the end busbar 10E shown in FIG. 4. FIG. 7 is a front view of the end busbar 10E shown in FIG. 4. FIG. 8 is a cross-sectional view of the end busbar 10E taken along the line VIII-VIII of FIG. 6. FIG. 9 is a cross-sectional view of the end busbar 10E taken along the line IX-IX of FIG. 7.

As described above, the battery module 100 of the present embodiment includes a plurality of battery cells 1, and busbars 10 connecting to external terminals 1p and 1n of the battery cells 1. One of the busbars 10 has a pair of terminal portions 11 and 12, a current-carrying portion 13 connecting the pair of terminal portions 11 and 12, and a fuse 14 provided in the current-carrying portion 13. The current-carrying portion 13 surrounds the fuse 14.

The battery module 100 of the present embodiment is configured so that only one of the end busbar 10E of the pair of end busbars 10E in the plurality of busbars 10 includes the fuse 14. Specifically, the battery module 100 of the present embodiment includes a pair of module terminals 101P and 101N to be connected to an external device as described above. The busbars 10 include a plurality of relay busbars 10J that connect the plurality of battery cells 1 in series, and a pair of end busbars 10E that connect the plurality of battery cells 1, which are connected in series by the plurality of relay busbars 10J, to the pair of module terminals 101P and 101N. The fuse 14 is placed at one of the end busbars 10E.

In other words, in the battery module 100 of this embodiment, the other busbars 10 except for the one end busbar 10E do not include the fuse 14. The busbar 10 including the fuse 14 is not limited to the end busbars 10E. That is, the fuse 14 may be provided in at least one of the plurality of relay busbars 10J included in the plurality of busbars 10, not in the end busbars 10E.

In the battery module 100 of the present embodiment, the pair of terminal portions 11 and 12 of each busbar 10 is provided at one end and the other end in a first direction (X-axis direction). In a state unfold to a flat surface as shown in FIG. 5, the current-carrying portion 13 has one end connected to the pair of terminal portions 11 and 12 and the other end provided with the fuse 14, in a second direction (Y-axis direction) orthogonal to the first direction. As shown in FIGS. 4 and 6 to 9, the fuse 14 is placed inside the current-carrying portion 13 bent in a tubular shape extending in the first direction. In one example, the first direction is the stacking direction of the battery cells 1, that is, the thickness direction of the battery cells 1, and the second direction is the width direction of the battery cells 1.

In the battery module 100 of the present embodiment, the current-carrying portion 13 is spirally wound around the fuse 14 for one or more laps in a cross section perpendicular to the first direction (X-axis direction). Specifically, the current-carrying portion 13 extends in the second direction from one end of the terminal portion 11 in the second direction (Y-axis direction), and is bent away from the battery cell 1 in the third direction (Z-axis direction) orthogonal to the first direction and the second direction. In one example, the third direction is the height direction of the battery cells 1.

The current-carrying portion 13, which extends in the second direction (Y-axis direction) from one end of the terminal portion 11 and is bent in the third direction (Z-axis direction), is further bent into a cylindrical shape having a central axis parallel to the first direction (X-axis direction). The cylindrically bent current-carrying portion 13 extends to a position facing the one end of the current-carrying portion 13 connected to the terminal portion 11 while keeping a distance in the third direction from the one end. The current-carrying portion 13 extends further in the second direction from the position, and has the tip portion located inside the cylindrically bent portion. The fuse 14 is provided at the tip portion of current-carrying portion 13.

The current-carrying portion 13 extends toward the battery cell 1 in the third direction (Z-axis direction), from one end of the terminal portion 12 in the second direction (Y-axis direction), and extends in the second direction and outward in the width direction of the battery cells 1. The current-carrying portion 13 is then bent away from the battery cells 1 in the third direction (Z-axis direction). The current-carrying portion 13 is further bent into a cylindrical shape having a central axis parallel to the first direction (X-axis direction), and extends to a position facing the part of the current-carrying portion 13 parallel to the first direction and the second direction while keeping a distance from the part in the third direction. The current-carrying portion 13 extends further in the second direction from the position, and has the tip portion located inside the cylindrically bent portion. The fuse 14 in provided at the tip portion of the current-carrying portion 13.

In the battery module 100 of the present embodiment, the current-carrying portion 13 in a state unfold to the flat surface has a slit 15 extending from one end between the pair of terminal portions 11, 12 to the fuse 14, in the second direction (Y-axis direction). With this configuration, a cross-sectional area of the current-carrying portion 13 in the cross section orthogonal to the first direction (X-axis direction) becomes smallest at the fuse 14.

In the state the current-carrying portion 13 is unfolded on a plane (XY plane) parallel to the first direction (X-axis direction) and the second direction (Y-direction), the slit 15 extends linearly in a direction intersecting the first and the second directions, for example. In another example, in the state the current-carrying portion 13 is unfolded on the plane, the slit 15 may extend in a stepped pattern alternately in the second direction and the first direction. With these configurations, the fuse 14 is off-centered to the side of the terminal portion 12 between the terminal portions 11 and 12, in the first direction.

In the battery module 100 of the present embodiment, the end busbars 10E can be entirely made of the same type of metal. The current-carrying portion 13 may have a first part 13a including the fuse 14, and a second part 13b connected to the first part 13a and the pair of terminal portions 11 and 12, for example. In this case, the melting point of a first metal, which is the material of the first part 13a, is preferably lower than the melting point of a second metal, which is the material of the second part 13b. That is, the end busbars 10E in the battery module 100 of the present embodiment may include a clad material made of aluminum and copper, for example. In this case, the material of the first part 13a of the current-carrying portion 13 may be aluminum, and the material of the second part 13b of the current-carrying portion 13 may be copper.

The following describes the action of the battery module 100 according to the present embodiment.

As described above, the battery module 100 of the present embodiment can supply electricity from the plurality of charged battery cells 1 to the external electrical device via the plurality of relay busbars 10J, the pair of end busbars 10E, and the pair of module terminals 101P and 101N. If an external short circuit occurs in the plurality of cells 1, for example, due to some abnormality, an abnormally large current flows in the fuse 14 of the end busbar 10E, and the fuse 14 blows. This allows the current path of the abnormally large current to be interrupted.

As described above, the battery module 100 of the present embodiment includes the plurality of battery cells 1, and the busbars 10 connecting to the external terminals 1p and 1n of the battery cells 1. One of the busbars 10 has a pair of terminal portions 11 and 12, a current-carrying portion 13 connecting the pair of terminal portions 11 and 12, and a fuse 14 is provided in the current-carrying portion 13. The current-carrying portion 13 surrounds the fuse 14.

With this configuration, the current-carrying portion 13 surrounding the fuse 14 prevents the molten metal from scattering when the fuse 14 blows. This prevents the molten metal at high temperatures from adhering to the resin members such as the cell holders 21, the insulation cover 24, and the module cover 25, and so enhances the safety of the battery module 100. The current-carrying portion 13 as a part of the busbar 10 covers the fuse 14 as a part of the busbar 10, and so this configuration does not require another additional member for covering the fuse 14 in the busbar 10.

In the battery module 100 of the present embodiment, the pair of terminal portions 11 and 12 are provided at one end and the other end in the first direction (X-axis direction). In the state of unfolded to the flat surface, in the second direction (Y-axis direction) orthogonal to the first direction, the current-carrying portion 13 has one end connected to the pair of terminal portions 11 and 12, and the other end provided with the fuse 14. The fuse 14 is placed inside the current-carrying portion 13 bent in a tubular shape extending in the first direction.

With this configuration, the fuse 14 is placed inside the tubular current-carrying portion 13 connecting the pair of terminal portions 11 and 12, and so the current-carrying portion 13 surrounds the fuse 14 provided in the current-carrying portion 13. Specifically, in the state of the current-carrying portion 13 is unfolded to a flat surface, the current-carrying portion 13 is bent in the second direction (Y-axis direction) from the end opposite to the pair of terminal portions 11 and 12 toward the pair of terminal portions 11 and 12 into a tubular shape having a central axis parallel to the first direction (X-axis direction).

As a result, the current-carrying portion 13 surrounds the fuse 14 provided in the current-carrying portion 13 at least in a cross section orthogonal to the first direction, so that the current-carrying portion 13 covers the fuse 14. Such bending of the current-carrying portion 13 into a tubular shape extending in the stacking direction (X-axis direction) of the battery cells 1 in which the pair of terminal portions 11 and 12 are placed side by side reduces the dimension of the current-carrying portion 13 in the width direction (Y-axis direction) of the battery cell 1, and so makes the battery module 100 compact.

In the battery module 100 of the present embodiment, the current-carrying portion 13 is spirally wound around the fuse 14 for one or more laps in a cross section perpendicular to the first direction (X-axis direction). This configuration allows the fuse 14 to be covered without gap at an angle of 360 degrees or more around the fuse 14, at least in a cross section orthogonal to the first direction.

In the battery module 100 of the present embodiment, the current-carrying portion 13 in a state unfolded to a flat surface has the slit 15 extending from one end in the second direction (Y-axis direction) between the pair of terminal portions 11, 12 to the fuse 14. With this configuration, a cross-sectional area of the current-carrying portion 13 in the cross section orthogonal to the first direction (X-axis direction) becomes smallest at the fuse 14. If an abnormally large current flows through the current-carrying portion 13, which is the current path between the pair of terminal portions 11 and 12, the fuse 14 can be selectively blown to interrupt the current path.

In the battery module 100 of the present embodiment, in the current-carrying portion 13 in a state unfolded on a plane parallel to the first direction (X-axis direction) and the second direction (Y-direction), the slit 15 extends linearly in a direction intersecting the first and the second directions. When the fuse 14 blows, this configuration allows the inner wall face of the slit 15 to receive the molten metal scattered in the direction orthogonal to the first direction. This makes it possible to more reliably prevent the molten metal due to the blowing of the fuse 14 from passing through the slit 15 and scattering to the outside of the cylindrical current-carrying portion 13 surrounding the fuse 14.

As described above, the battery module 100 of the present embodiment may be configured so that, in the state of the current-carrying portion 13 is unfolded to the flat surface, the slit 15 extends in a stepped pattern alternately in the second direction (Y-axis direction) and the first direction (X-axis direction). When the fuse 14 blows, this configuration also allows the inner wall face of the slit 15 to receive the molten metal scattered in the direction orthogonal to the first direction. This makes it possible to more reliably prevent the molten metal from passing through the slit 15 and scattering to the outside of the cylindrical current-carrying portion 13.

The battery module 100 of the present embodiment is configured so that the current-carrying portion 13 may have the first part 13a including the fuse 14 and the second part 13b connected to the first part 13a and the pair of terminal portions 11 and 12 as described above. In this case, the melting point of a first metal, which is the material of the first part 13a, is preferably lower than the melting point of a second metal, which is the material of the second part 13b as described above.

With this configuration, the molten metal of the fuse 14 included in the first part 13a after blowing attached to the second part 13b of the current-carrying portion 13 does not cause melting or deformation of the second part 13b of the current-carrying portion 13. This further improves the safety of the battery module 100.

The battery module 100 of the present embodiment includes the pair of module terminals 101P and 101N to be connected to an external device as described above. The busbars 10 include the plurality of relay busbars 10J that connect the plurality of battery cells 1 in series, and the pair of end busbars 10E that connect the plurality of battery cells 1, which are connected in series by the plurality of relay busbars 10J, to the pair of module terminals 101P and 101N. The fuse 14 is placed at one of the end busbars 10E.

In this way, one of the end busbar 10E connecting the plurality of battery cells 1 connected in series to the module terminals 101P and 101N includes the fuse 14, and this configuration safely and reliably interrupts the current path of the battery module 100 through which high-voltage and high current flows in an abnormal condition. The fuse 14 is provided in one of the end busbar 10E at the ends in the stacking direction of the plurality of battery cells 1, and this makes it possible to easily keep a space for providing the current-carrying portion 13 surrounding the fuse 14. This improves the degree of freedom in designing of the battery module 100.

The battery module 100 of the present embodiment includes the pair of end plates 22 placed at both ends in the stacking direction of the plurality of battery cells 1 each having a flattened rectangular shape and stacked in the thickness direction. The end busbars 10E are fixed to the end plates 22. This configuration allows the fixation of the end busbars 10E to the end plates 22 via the fixing parts 21a of the cell holders 21, for example, and so configures the module terminals 101P and 101N with the pair of end busbars 10E.

As described above, the present embodiment provides the battery module 100 that has better safety than conventional battery modules.

The battery module of the present disclosure is not limited to the structure of the battery module 100 according to the present embodiment. For example, the battery module 100 of the present embodiment is configured so that only one of the pair of end busbars 10E in the plurality of busbars 10 includes the fuse 14. In the battery module of the present disclosure, the busbar 10 including the fuse 14 is not limited to the end busbar 10E. That is, instead of the end busbar 10E, at least one of the relay busbars 10J may include the fuse 14 surrounded by the current-carrying portion 13.

Figure 10:
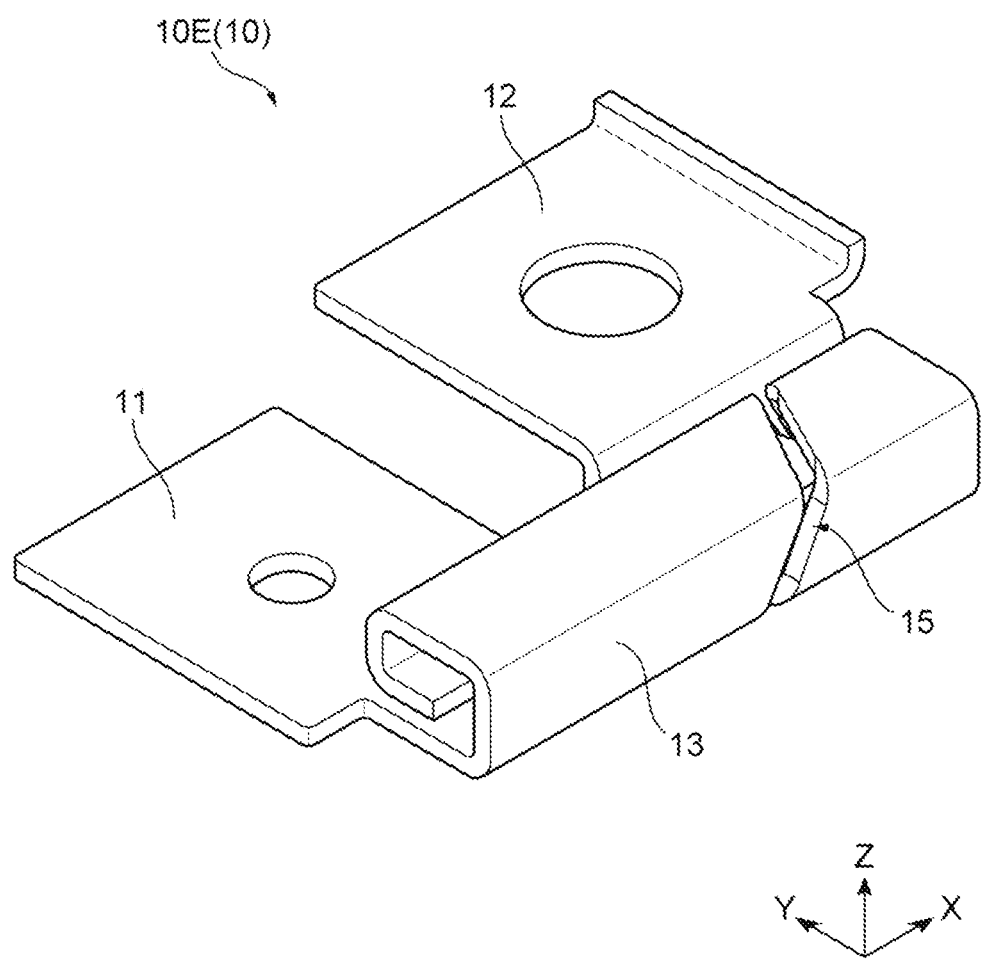
FIG. 10 is a perspective view of a modified example of the busbar in FIG. 4.

Next referring to FIGS. 10 and 11 together with FIGS. 1 through 3 and FIG. 5, a modified example of the battery module 100 according to the above-stated embodiment is described below. FIG. 10 is a perspective view of a modified example of the end busbar 10E in FIG. 4. FIG. 11 is a cross-sectional view of the end busbar 10E shown in FIG. 10 according to the modified example of the battery module 100, which is a view corresponding to FIG. 8.

The battery module of this modified example shown in FIGS. 5, 10 and 11 includes a current-carrying portion 13 that has a rectangular tubular shape bent at an angle of approximately 90 degrees at a plurality of positions. The current-carrying portion 13 is spirally wound around the fuse 14 for one or more laps. The battery module of this modified example having such a configuration can also obtain the same effects as the battery module 100 according to the above-described embodiment.

The current-carrying portion 13 in the battery module according to this modified example may have a closing portion that closes the openings at both ends in the first direction (X-axis direction). For example, as shown in FIG. 5, the closing portion 16 is formed as a tongue-shaped or tab-shaped convex at both ends of the current-carrying portion 13 in the first direction in the state unfolded to the flat surface.

This closing portion 16 has a planar shape that corresponds to a cross-sectional shape orthogonal to the first direction of the current-carrying portion 13 bent in a tubular shape, for example. That is, when the cross-sectional shape of the current-carrying portion 13 bent into a tubular shape is approximately rectangular, the planar shape of the closing portion 16 can be approximately rectangular. When the cross-sectional shape of the current-carrying portion 13 bent into a tubular shape is approximately circular, the planar shape of the closing portion 16 can be approximately circular.

After bending the current-carrying portion 13 in the state unfolded to the plane into a tubular shape, the closing portion 16 is bent in the third direction (Z-axis direction) orthogonal to the first direction (X-axis direction) and the second direction (Y-axis direction). As a result, the closing portion 16 becomes approximately orthogonal to the first direction and becomes approximately parallel to the second and third directions, and faces the openings at both ends of the tubular current-carrying portion 13 extending in the first direction to close the openings.

When the fuse 14 blows, this configuration allows the closing portion 16 to receive the molten metal scattered in the direction toward the openings at both ends of the tubular current-carrying portion 13. This makes it possible to more reliably prevent the molten metal due to the blowing of the fuse 14 from scattering to the outside through the openings at both ends of the tubular current-carrying portion 13, and so further enhances the safety of the battery module.

That is a detailed description of the embodiment of the battery module of the present disclosure and its modified example, with reference to the drawings. The specific configuration of the present disclosure is not limited to the above-stated embodiment and the modified example, and the design may be modified variously without departing from the spirits of the present disclosure. The present disclosure also covers such modified embodiments.

REFERENCE SIGNS LIST

1 Battery cell
1p External terminal
1n External terminal
10 Busbar
10E End busbar
10J Relay busbar
11 Terminal portion
12 Terminal portion
13 Current-carrying portion
13a First part
13b Second part
14 Fuse
15 Slit
16 Closing portion
22 End plate
100 Battery module
101P Module terminal
101N Module terminal

The invention claimed is:

1. A battery module comprising:
a plurality of battery cells; and
busbars connected to external terminals of the battery cells,
the busbars include a busbar having a pair of terminal portions, a current-carrying portion connecting the pair of terminal portions, and a fuse provided in the current-carrying portion,
the current-carrying portion surrounding the fuse such that a part of the current-carrying portion is disposed between the fuse and the battery cells,
the pair of terminal portions are provided at one end and the other end of the busbar in a first direction,
the current-carrying portion, in a state of unfolded to a flat surface, in a second direction orthogonal to the first direction, has one end connected to the pair of terminal portions and the other end provided with the fuse, and
the fuse is located inside the current-carrying portion bent in a tubular shape extending in the first direction.

2. The battery module according to claim 1, wherein the current-carrying portion is spirally wound around the fuse for one or more laps in a cross section perpendicular to the first direction.

3. The battery module according to claim 1, wherein the current-carrying portion in a state of unfolded to a flat surface has a slit extending from the one end between the pair of terminal portions to the fuse.

4. The battery module according to claim 3, wherein in a state of the current-carrying portion unfolded to a flat surface, the slit extends linearly in a direction intersecting the first and the second directions.

5. The battery module according to claim 3, wherein in a state of the current-carrying portion unfolded to a flat surface, the slit extends in a stepped pattern alternately in the second direction and the first direction.

6. The battery module according to claim 1, wherein the current-carrying portion has a first part including the fuse, and a second part connected to the first part and the pair of terminal portions, and
the first part includes a first metal and the second part includes a second metal, the first metal having a melting point lower than a melting point of the second metal.

7. The battery module according to claim 1, wherein the current-carrying portion has closing portions closing openings at both ends in the first direction.

8. The battery module according to claim 1, further comprising a pair of module terminals to be connected to an external device,
the busbars include a plurality of relay busbars that connect the plurality of battery cells in series, and a pair of end busbars that connect the plurality of battery cells, which are connected in series by the plurality of relay busbars, to the pair of module terminals, and
the fuse is disposed at one of the end busbars.

9. The battery module according to claim 8, further comprising a pair of end plates disposed at both ends in a stacking direction of the plurality of battery cells each having a flattened rectangular shape and stacked in the thickness direction, and
the end busbars are fixed to the end plates.

* * * * *